(12) United States Patent
Bammel et al.

(10) Patent No.: US 12,665,902 B2
(45) Date of Patent: Jun. 23, 2026

(54) PINNING DEVICE IDENTIFIERS TO CRYPTOGRAPHIC KEY PAIRS

(71) Applicant: CISCO TECHNOLOGY, INC., San Jose, CA (US)

(72) Inventors: Jennifer Bammel, Dexter, MI (US); David William Matteson, Dexter, MI (US); Kevin Johnson, Ypsilanti, MI (US); Harold Todd Chapman, Howell, MI (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 147 days.

(21) Appl. No.: 18/659,597

(22) Filed: May 9, 2024

(65) Prior Publication Data

US 2025/0260682 A1      Aug. 14, 2025

Related U.S. Application Data

(60) Provisional application No. 63/553,552, filed on Feb. 14, 2024.

(51) Int. Cl.
 *H04L 9/40* (2022.01)
 *H04L 9/32* (2006.01)
(52) U.S. Cl.
 CPC ........ *H04L 63/0876* (2013.01); *H04L 9/3213* (2013.01); *H04L 9/3247* (2013.01); *H04L 63/0807* (2013.01)
(58) Field of Classification Search
 CPC ............. H04L 63/0876; H04L 63/0807; H04L 9/3247; H04L 9/3213
 See application file for complete search history.

(56) References Cited

U.S. PATENT DOCUMENTS

| | | | |
|---|---|---|---|
| 11,770,379 B1 | 9/2023 | Grubin | |
| 2009/0300744 A1* | 12/2009 | Guo | G06F 21/34 |
| | | | 726/7 |
| 2016/0285873 A1* | 9/2016 | Lambert | H04W 12/04 |
| 2016/0352524 A1* | 12/2016 | Kinney | H04L 63/0876 |
| 2017/0070486 A1* | 3/2017 | Lyons | H04L 63/061 |
| 2017/0195331 A1* | 7/2017 | Wu | H04L 43/045 |
| 2018/0183586 A1 | 6/2018 | Bhargav-Spantzel et al. | |

(Continued)

OTHER PUBLICATIONS

Malche, Timothy; Maheshwary, Priti; Kumar, Rakesh; "Secret Key based Sensor Node Security in the Internet of Things (IoT)," 5th International Conference on Communication and Electronics Systems (ICCES), IEEE, Jun. 10-12, 2020, Coimbatore, India, pp. 464-469.*

(Continued)

*Primary Examiner* — Victor Lesniewski
(74) *Attorney, Agent, or Firm* — Burris Law, PLLC

(57) ABSTRACT

In one embodiment, a method for authenticating a computer system is provided. The method includes: receiving, by a processor, device identifier information associated with the computer system; generating, by the processor, a device identifier and an enrollment token based on the device identifier information; communicating, by the processor, the device identifier and the enrollment token to the computer system; receiving, by the processor, key data in response to the communicating; and performing, by the processor, authentication of the computer system based on the key data.

20 Claims, 4 Drawing Sheets

(56) References Cited

U.S. PATENT DOCUMENTS

| 2018/0227128 | A1 | | 8/2018 | Church et al. |
| 2018/0332016 | A1 | * | 11/2018 | Pandey ............... H04L 63/0428 |
| 2019/0079504 | A1 | * | 3/2019 | Wu ........................ G06Q 10/04 |
| 2019/0305964 | A1 | | 10/2019 | Hamel et al. |
| 2019/0327223 | A1 | | 10/2019 | Kumar et al. |
| 2019/0349359 | A1 | | 11/2019 | Dixon et al. |
| 2019/0386981 | A1 | | 12/2019 | Ramesh Kumar et al. |
| 2020/0267006 | A1 | | 8/2020 | Nyman et al. |
| 2021/0314312 | A1 | * | 10/2021 | Xu ....................... G06F 16/9535 |
| 2022/0131857 | A1 | | 4/2022 | Nolte et al. |
| 2022/0368528 | A1 | * | 11/2022 | Vennapusa ............ H04L 9/3073 |
| 2023/0131060 | A1 | * | 4/2023 | Ko ........................ H04L 9/3213 |
| | | | | 713/151 |
| 2023/0205865 | A1 | * | 6/2023 | Mittal ................. H04L 63/0853 |
| | | | | 726/9 |
| 2024/0195795 | A1 | * | 6/2024 | Evans ................... H04L 9/3268 |
| 2025/0070958 | A1 | * | 2/2025 | Rennich ................ H04L 9/3213 |

OTHER PUBLICATIONS

Mini TT; "Secure Device Identifiers and Device Enrollment in Industrial Control System," International Conference on Advanced Networks and Telecommunications Systems (ANTS), IEEE, Dec. 16-19, 2019, Goa, India, pp. 1-5.*

International Search Report and Written Opinion for International Application No. PCT/US2025/015054, mailed Apr. 2, 2025, 13 Pages.

* cited by examiner

PINNING DEVICE IDENTIFIERS TO CRYPTOGRAPHIC KEY PAIRS

CROSS REFERENCE TO RELATED APPLICATIONS

This application claims the benefit of U.S. Provisional Application No. 63/553,552, filed Feb. 14, 2024, which is herein incorporated by reference in its entirety.

TECHNICAL FIELD

The present disclosure relates generally to security systems and more particularly to security systems for managing access to applications or services on devices.

BACKGROUND

Many service or application providers require a user to present authentication information in order to gain access to a specific service or application. For example, an employer may require an employee to enter a password or other authentication factor to access computer resources remotely. Many sensitive services and applications require multi-factor authentication. That is, a user provides multiple authenticators in order to gain access to a resource, service, and/or application. Authentication factors for individuals are generally categorized in three classes: something the user is (e.g., a biometric such as a fingerprint), something the user has (e.g., a security token), and something the user knows (e.g., a password). A typical security token may use a symmetric cryptography algorithm to provide authentication credentials. For example, the token and the verifying entity (e.g., a network server) may both maintain or generate the same value (e.g., using a particular algorithm and seed).

In some instances, an administrator may wish to limit access to the application or service to a particular subset of devices. In such instances, digital certificates including a security token may be sent to these machines, as a stamp of approval of the device, in order to manage access by the particular devices. However, depending on how these digital certificates and security tokens are managed, the information still has a potential to be spoofed by a user attempting to gain access to the applications or services on other devices.

Accordingly, it is desirable to provide improved methods and systems for managing access of applications or services on devices. Furthermore, other desirable features and characteristics of the present disclosure will become apparent from the subsequent detailed description and the appended claims, taken in conjunction with the accompanying drawings and the foregoing technical field and background.

DRAWINGS

In order that the disclosure may be well understood, there will now be described various forms thereof, given by way of example, reference being made to the accompanying drawings, in which.

DESCRIPTION OF EXAMPLE EMBODIMENTS

Figure 1:
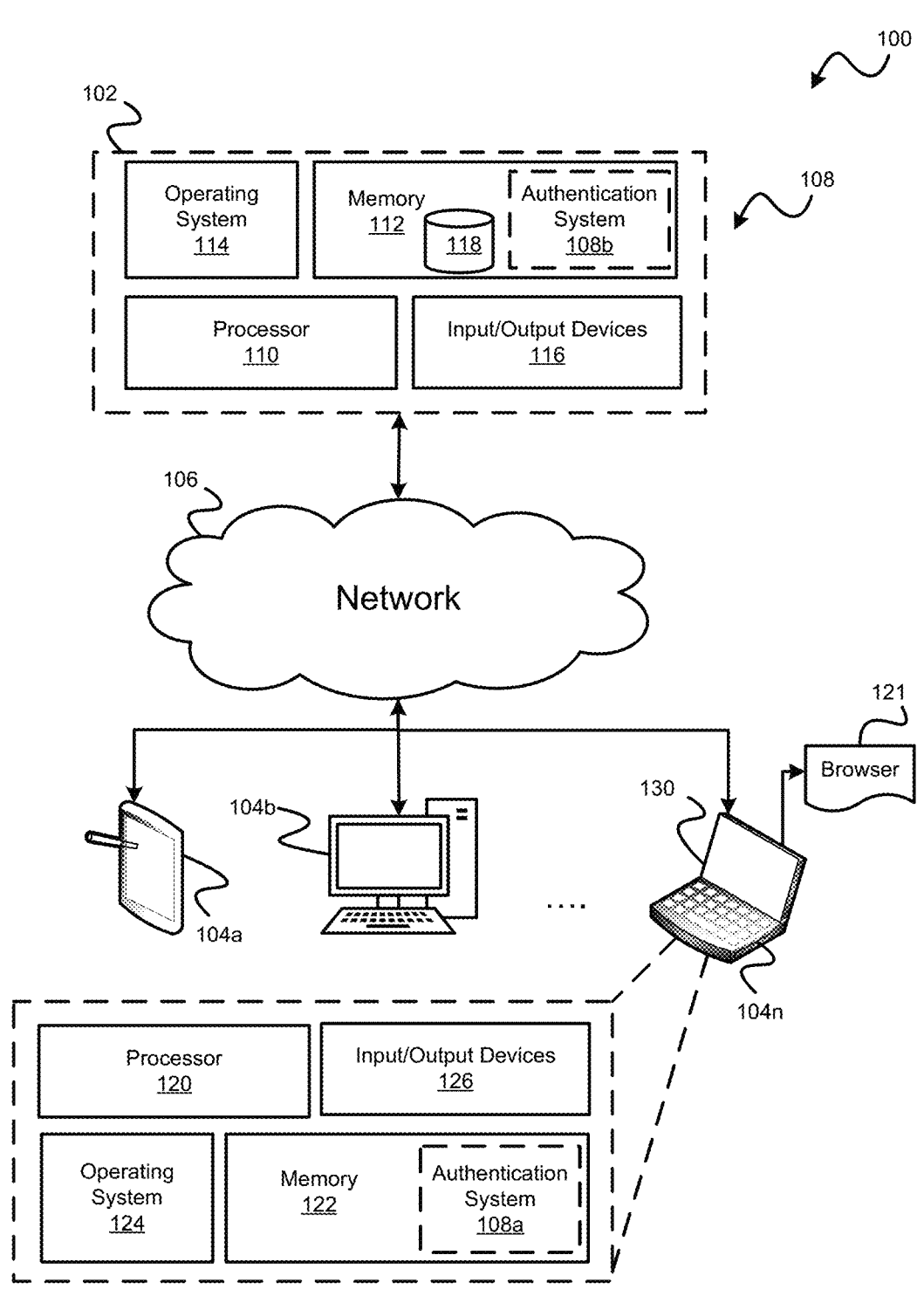
FIG. 1 is a functional block diagram illustrating a computing system having an authentication system in accordance with various embodiments.

The following description is merely exemplary in nature and is not intended to limit the present disclosure, application, or uses. It should be understood that throughout the drawings, corresponding reference numerals indicate like or corresponding parts and features. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Overview

According to various embodiments, systems, methods, and computer program products are provided for authenticating a computer system. A method includes: receiving, by a processor, device identifier information associated with the computer system; generating, by the processor, a device identifier and an enrollment token based on the device identifier information; communicating, by the processor, the device identifier and the enrollment token to the computer system; receiving, by the processor, key data in response to the communicating; and performing, by the processor, authentication of the computer system based on the key data.

Another method includes determining, by a processor, device identifier information associated with the computer system; receiving, by the processor, a device identifier and an enrollment token based on the device identifier information; generating, by the processor, key data based on the device identifier and the enrollment token using cryptography; and performing, by the processor, authentication of the computer system based on the key data.

EXAMPLE EMBODIMENTS

With reference to FIG. 1, an exemplary computer environment is shown generally at 100 having a server system 102 including one or more servers that are communicatively coupled to one or more computer systems 104a-104n (generally referred to as the computer system 104) through a network 106. The computer environment 100 is shown having an authentication system shown generally at 108 in accordance with various embodiments. As can be appreciated, elements of the authentication system 108 disclosed herein may be located on one or more of the computer systems 104a-104n, located on the server system 102, located on a device or node of the network 106, or distributed between any of the server system 102, the one or more computer systems 104a-104n, and one or more devices or nodes of the network 106. For exemplary purposes, the disclosure will be discussed in the context of the authentication system 108 being implemented on the server system 102 and the computer system 104, for example, as a client-server based authentication system 108 having an authentication system 108a and an authentication system 108b.

In various embodiments, the server system 102 stores and makes available services or applications to users of the computer environment 100. These services or applications may provide secured data or other important information that requires security clearance before accessing. The server system 102 generally operates with any sort of conventional processing hardware, including, but not limited to, at least one processor 110, memory 112, an operating system 114, an input/output device 116, and a database 118 that stores the services, applications, and/or secured data.

The processor 110 may be implemented using any suitable processing system, such as one or more processors, controllers, microprocessors, microcontrollers, processing cores and/or other computing resources spread across any number of distributed or integrated systems, including any number of "cloud-based" or other virtual systems. The memory 112 represents any non-transitory short- or long-term storage or other computer-readable media capable of storing programming instructions for execution on the processor 110, including any sort of random access memory (RAM), read only memory (ROM), flash memory, magnetic or optical mass storage, and/or the like. The computer-executable programming instructions, when read and executed by the processor 110, cause the processor 110 to create, generate, or otherwise facilitate access to the secured data and perform one or more additional tasks, operations, functions, and/or processes described herein. In various embodiments, the memory 112 includes the database 118 that stores secured data associated with the applications or services.

As can be appreciated, the memory 112 represents one suitable implementation of such computer-readable media, and alternatively or additionally, the processor 110 could receive and cooperate with external computer-readable media that is realized as a portable or mobile component or application platform, e.g., a portable hard drive, a USB flash drive, an optical disc, or the like. The memory 112 may further store the authentication system 108 (e.g., authentication system 108b) in various embodiments.

The operating system 114 includes computer-executable programming instructions, when read and executed by the processor 110, cause the processor 110 to operate the server system's basic functions such as scheduling tasks, executing applications, memory allocation, and controlling the input/output devices 116. The input/output devices 116 generally represents the interface(s) to networks (e.g., to the network 106, or any other local area, wide area, or other network), mass storage, display devices, data entry devices, and/or the like.

In various embodiments, the network 106 generally includes interconnected network nodes that are arranged according to one or more of a variety of network topologies and that are configured to communicate data according to one or more communication protocols. The network nodes can include, for example, network interface controllers, repeaters, hubs, bridges, switches, routers, firewalls, modems, etc. The network nodes may be interconnected based on physically wired, optical, and/or wireless radio-frequency topologies.

The computer system 104 generally includes any sort of personal computer, workstation, mobile telephone, tablet, or other network-enabled client device on the network 106. The computer system 104 generally operates with any sort of conventional processing hardware, including but not limited to, at least one processor 120, memory 122, an operating system 124, an input/output device 126. The processor 120 may be implemented using any suitable processing system, such as one or more processors, controllers, microprocessors, microcontrollers, processing cores and/or other computing resources spread across any number of distributed or integrated systems, including any number of "cloud-based" or other virtual systems.

The memory 122 represents any non-transitory short- or long-term storage or other computer-readable media capable of storing programming instructions for execution on the processor 120, including any sort of random access memory (RAM), read only memory (ROM), flash memory, magnetic or optical mass storage, and/or the like. The computer-executable programming instructions, when read and executed by the processor, cause the processor to create, generate, or otherwise facilitate the operations, functions, and/or processes described herein. It should be noted that the memory 122 represents one suitable implementation of such computer-readable media, and alternatively or additionally, the processor 120 could receive and cooperate with external computer-readable media that is realized as a portable or mobile component or application platform, e.g., a portable hard drive, a USB flash drive, an optical disc, or the like. The memory 122 may further store the authentication system 108 (e.g., authentication system 108a) in various embodiments.

The operating system 124 includes computer-executable programming instructions, when read and executed by the processor 120, cause the processor 120 to operate the computer system's basic functions such as scheduling tasks, executing applications, memory allocation, and controlling input/output devices. The input/output device generally represents the interface(s) to networks (e.g., to the network 106, or any other local area, wide area, or other network), mass storage, display devices, data entry devices and/or the like.

In an exemplary embodiment, the computer system 104 includes or communicates with a display device 130, such as a monitor, screen, or another conventional electronic display capable of presenting application or service related content retrieved from the server system 102 or other internet device via the network 106.

According to a typical use case, a user operates a conventional browser 121 or other client program such as an application executed by the computer system 104 to contact the server system 102 for access to an application or service via the network 106 using a networking protocol, such as the hypertext transport protocol (HTTP) or the like. The client-based authentication system 108a then communicates with the server-based authentication system 108b to coordinate secured access associated with the user and the specific computer system 104 (e.g., 104n). As will be discussed in more detail, the secured access process includes an improved pre-authentication trust check of the computer system 104 that is based on data established during a registration process.

Figure 2:
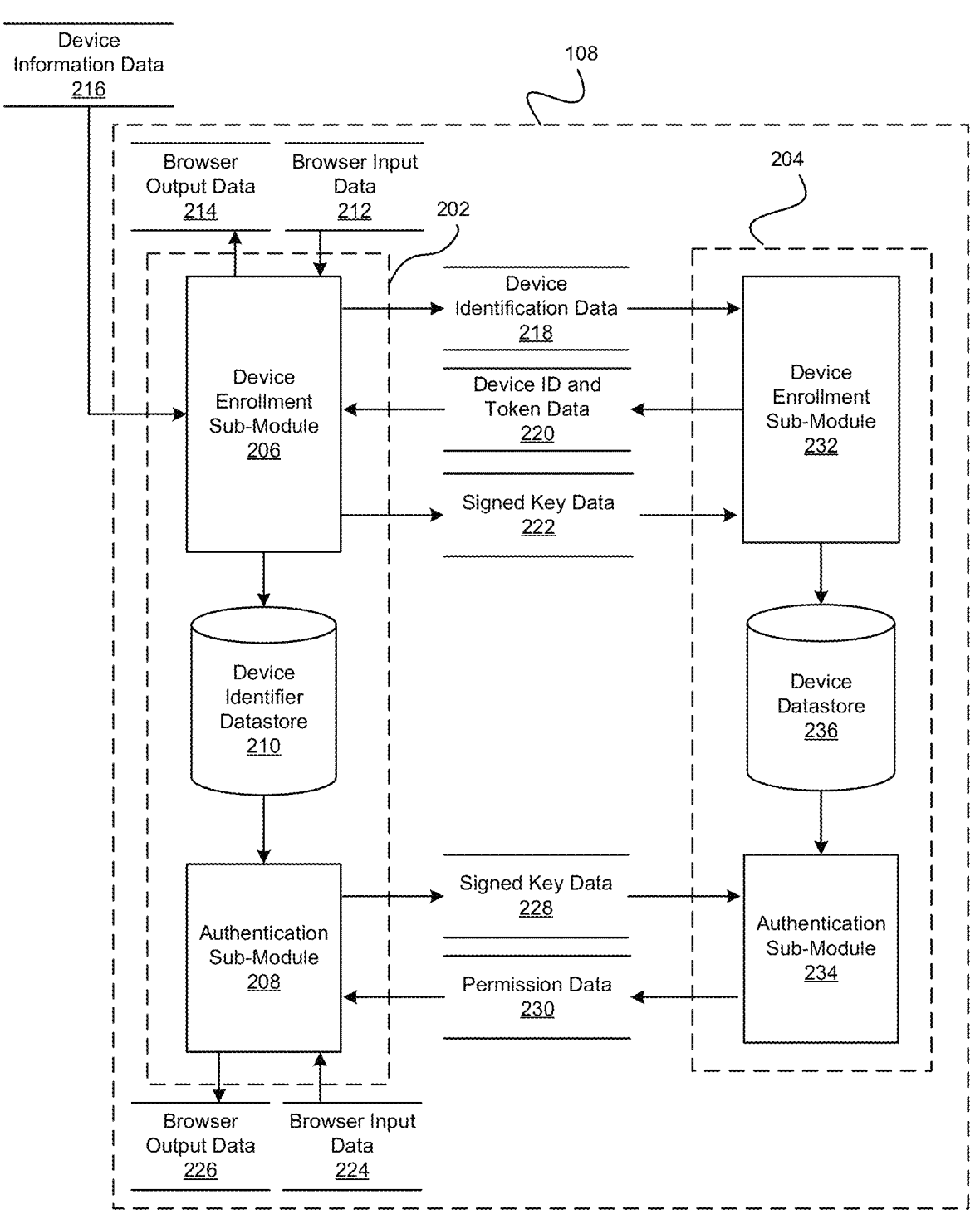
FIG. 2 is a dataflow diagram illustrating an example an authentication system in accordance with various embodiments.

With reference now to FIG. 2 and with continued reference to FIG. 1, a dataflow diagram illustrates the authentication system 108 in accordance with various embodiments. As can be appreciated, various exemplary embodiments of the authentication system 108, according to the present disclosure, may include any number of modules and/or sub-modules. In various exemplary embodiments, the modules and sub-modules shown in FIG. 2 may be combined and/or further partitioned to enable secure access to applications and services. In various embodiments, the authentication system 108 includes a client module 202 that, for example, may be implemented as part of the authentication system 108a and a server module 204 that, for example, may be implemented as part of the authentication system 108b.

In various embodiments, the client module 202 includes a device enrollment sub-module 206, an authentication sub-module 208, and a device identifier datastore 210. The device enrollment sub-module 206 enrolls with the server module 204 any first-time computer systems 104 (e.g., computer system 104n) as a new device. For example, the device enrollment sub-module 206 interacts with a user of the computer system 104 by communicating data to and from the browser 121 through browser input data 212 and browser output data 214. Upon receipt of the browser input data 212 from the browser indicating that health data has been requested, the device enrollment sub-module 206 obtains device identification data 216 associated with the particular computer system 104 and any other device health information and stores the data in the device identifier datastore 210.

For example, the computer systems 104 generally have a notion of primary identifiers and secondary identifiers. The primary identifiers are fairly static, and the secondary identifiers are somewhat mutable and typically associate with a single primary identifier. The following table illustrates exemplary primary and secondary device identifiers that may be collected from the computer system 104 in various embodiments.

TABLE 1

| Name | Description | Priority | Source |
|---|---|---|---|
| machine_guid | Unique identifier of the client machine. (Windows/Linux) | primary | Device Operating System (OS) |
| computer_sid | Security identifier of the computer. | secondary | Mobile Device Management (MDM) |
| domain_sid | Domain identifier of the computer. | n/a | MDM |
| hardware_uuid | Hardware identifier of the computer. (MacOS) | Primary | Device |
| intune_id | Intune identifier. | secondary | MDM |
| amp_guid | Advanced malware protection identifier. | secondary | Endpoint information |

The device enrollment sub-module 206 communicates the device identification data 216 to the server module 204 as device identification data 218. In response, if the computer system 104 is not yet enrolled as a device, the device enrollment sub-module 206 receives a one-time registration token and a device identifier (ID) from the server module 204. For example, the one-time registration token and a device identifier (ID) are received as the device ID and token data 220. The device enrollment sub-module 206 generates keypairs from the information. Each keypair can include a public key and a private key that is generated using, for example, cryptography. The keypair for the device identifier is stored in the device identifier datastore 210 and any subsequent enrollment on this computer system 104 will not generate a new device keypair. This ensures one consistent record is maintained to tie the identifiers of the computer system 104 to the computer system itself, regardless of how many users share it.

The device enrollment sub-module 206 communicates the public key signed with the private key to the server module 204 as signed key data 222.

After enrollment of the computer system 104 as a new device, the authentication sub-module 208 authenticates subsequent uses of the computer system 104 by a user. For example, the authentication sub-module 208 interacts with a user of the computer system 104 via communicating data to and from the browser 121 through browser input data 224 and browser output data 226. Upon receipt of browser input data 224 from the browser 121 indicating that health data has been requested, the authentication sub-module 208 obtains from the device identifier datastore 210 the device identifier data associated with the particular computer system 104. The authentication sub-module 208 generates the key data for the user and communicates key data including the public key associated with the device identifier and the public key associated with the user to the server module 204, as for example, signed key data 228 that is signed with a private key.

In response, the authentication sub-module 208 receives permission data 230. The permission data 230 includes an indication of whether the server module 204 grants access to the application or service. The authentication sub-module 208 communicates the status of the permission data 230 to the browser 121 via the browser output data 226.

The server module 204 includes a device enrollment sub-module 232, an authentication sub-module 234, and a device datastore 236. The device enrollment sub-module 232 receives the device identification data 218 and begins enrollment by generating a server specific identifier for the device and a one-time enrollment token. The device enrollment sub-module 232 communicates the device identifier and the token as the device ID and token data 220. In response, the device enrollment sub-module 232 receives the signed key data 222 and enrolls the computer system 104 as a new device by validating the signature from the signed key data 222, validating the associated token from the signed key data 222, and storing the public key in the device datastore 236.

The authentication sub-module 234 receives this signed key data 228 and authenticates the user and the device by validating the signature from the signed key data 228, validating the identifier of the device, and storing the public keys. When the validation is successful, the authentication sub-module 234 generates the permission data 230 granting access to the application or service. When the validation is not successful, the authentication sub-module 234 generates permission data 230 indicating that access to the application or service is denied.

In various other embodiments, the server module 204 may communicate the permission data 230 directly to the browser 121 instead of communicating to the browser 121 through the client module 202.

Figure 3:
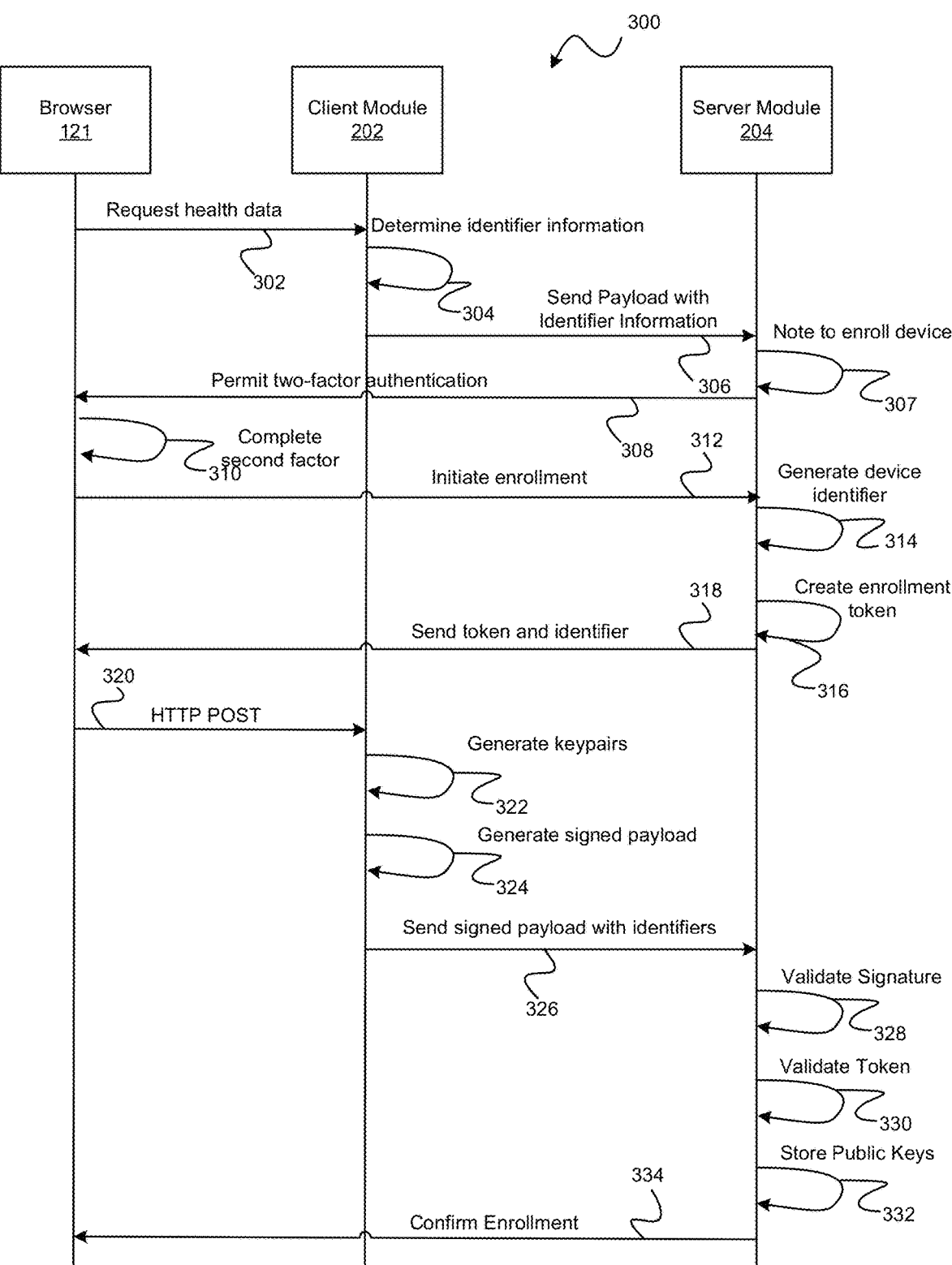
FIGS. 3 and 4 are sequence diagrams illustrating example registration and authentication processes that may be performed by the authentication system in accordance with various embodiments.
Figure 4:
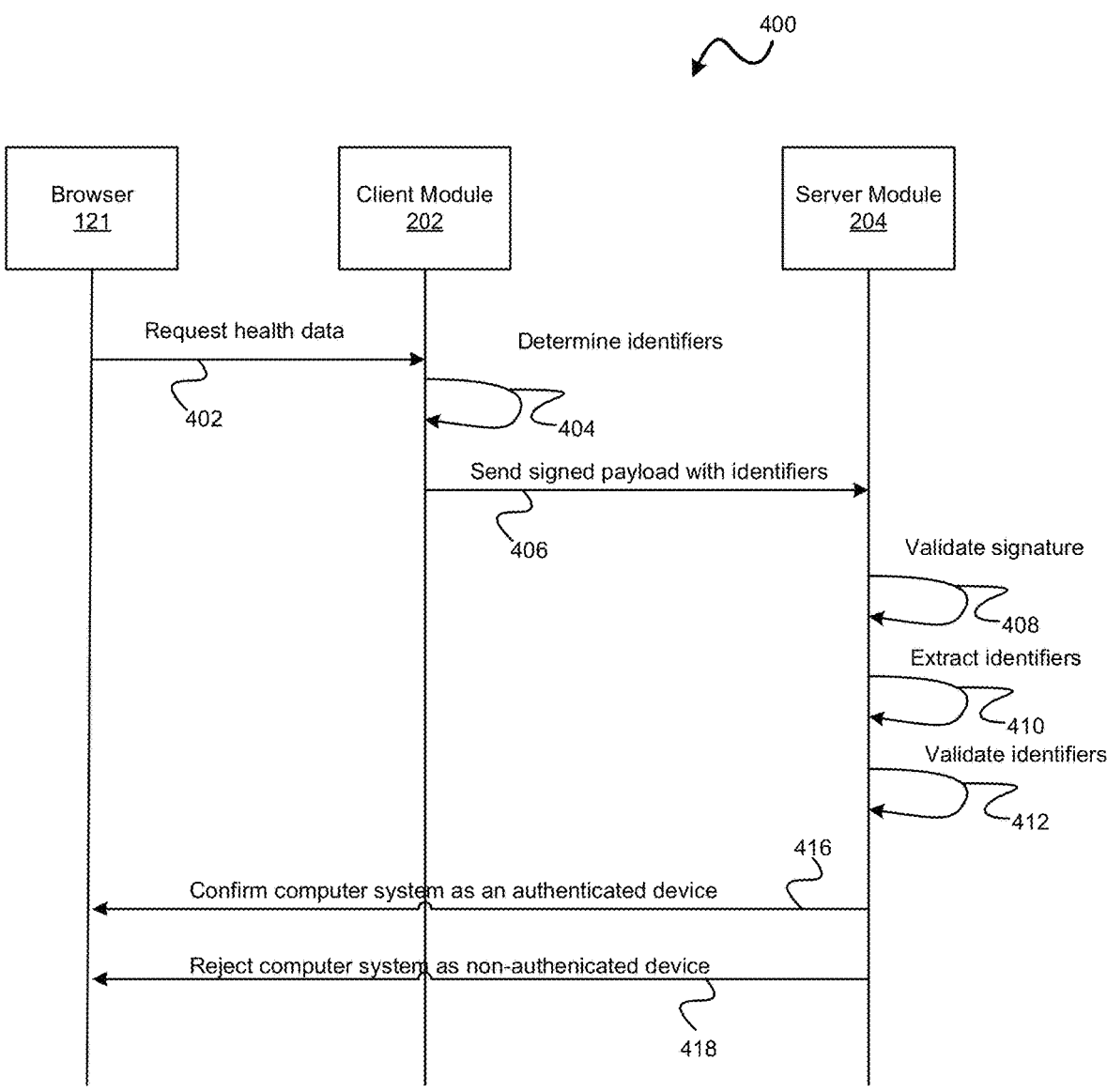

With reference now to FIGS. 3 and 4 and with continued reference to FIGS. 1-2, sequence diagrams illustrate example methods or processes 300, 400 for authenticating a user and a computer system in accordance with various embodiments. As can be appreciated in light of the disclosure, the order of operations performed by the processes 300, 400 is not limited to the sequential execution as illustrated in FIGS. 3, 4 but may be performed in one or more varying orders as applicable and in accordance with the present disclosure. In various embodiments, the processes 300, 400 can be scheduled to run based on one or more predetermined events or run automatically based on an occurrence of one or more events.

In one example, the process 300 may be performed to initially enroll the computer system 104 as a trusted device via the browser 121, the client module 202, and the server module 204. In various embodiments, the enrollment is performed without administrator action and occurs automatically during the first time a user completes a two-factor authentication process. For example, during the two-factor authentication process a user authenticates with their first factor via the browser 121 and is sent to a device health check screen in the browser 121 and the process 300 begins.

The browser 121 initiates the device health check by requesting a collection of device health data, including any identifier information of the computer system 104 at 302. The client module 202 determines the device identification information at 304. The client module 202 communicates the device health data including the device identification information as a payload to the server module 204 at 306. The server module 204 notes that the payload is in the same format as the current health data payload (i.e., not a signed payload by checking the absence or presence of a signature) and that enrollment should be triggered after the two-step authentication completes at 307.

The server module 204 then sends confirmation to the browser 121 that that the second factor of authentication may proceed at 308. The browser 121 then completes the second factor of authentication at 310.

Once two-step authentication successfully completes, but before the user is sent to the protected application or service, the browser 121 notifies the server module 204 at 312 that enrollment for the computer system 104 can begin.

The server module 204 then begins enrollment by generating a server specific identifier for the computer system 104 based on the device information at 314. The server module 204 then generates a one-time enrollment token at 316. The server module 204 communicates the device identifier and the token to the browser 121 at 318. The browser 121, at 320, forwards the identifier and the token via, for example, a HTTP(s) POST with the information needed to correlate a keypair to this user on this specific computer system.

The client module 202 receives the data, then generates the cryptographic keypairs for the user and the computer system 104 as a whole and stores the private keys in the device identifier datastore 210 at 322. A payload is created including the public keys and identifiers to tie the user and the computer system to the private keys at 324.

Once the private keys and other information is stored successfully in the datastore, the payload is signed and communicated to the server authentication module at 326.

The signature of the signed payload is validated against the public keys provided in the payload at 328. If the device identifier has not already been enrolled, the enrollment request passes the policy check of whether or not this device identifier has been used before and validation is completed at 328. The token is validated at 330 and the public keys are stored at 332.

Thereafter, the user has successfully completed device health automatic enrollment and, the server module 204 communicates a confirmation of the enrollment to the browser 121 at 334 so that all subsequent authentications will be able to use a signed data payload. Thereafter, the process 300 ends and the applications or services can be made available to the user.

As can be appreciated, in various other embodiments, enrollment may be initiated manually by, for example, an administrator through a browser or a user interface of an administrative application. For example, the request for health data for one or more computer systems 104 may be initiated by the administrator.

With reference now to FIG. 4, the sequence diagram illustrates a process 400 for subsequent authentication of the user and the computer system 104 using the stored information from the enrollment process 300.

For example, the browser 121 initiates the device health check by requesting a collection of device health data at 402. The client module 202 determines the device identifier at

404. The client module 202 communicates a signed payload including the device identifier to the server module 204 at 406.

The signature of the payload is validated at 408. The device identifier in the payload is extracted at 410 and validated at 412 by comparing the identifier with the stored identifier.

The server module 204 communicates a confirmation or rejection of the authentication of the computer system 104 to the browser 121 at 416 or 418, respectively. Thereafter, the process 400 ends and the applications or services can be made available to the user.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for authenticating a computer system, comprising:

receiving, by a processor of a server, device identifier information associated with the computer system;

generating, by the processor of the server, a device identifier and an enrollment token based on the device identifier information;

communicating, by the processor of the server, the device identifier and the enrollment token to the computer system;

receiving, by the processor of the server from the computer system, a public key signed with a private key as a signed key data in response to the communicating, wherein the public key and the private key are parts of a keypair generated by the computer system from the enrollment token and the device identifier as inputs to a cryptographic key generation process; and performing, by the processor, authentication of the computer system based on the signed key data.

2. The method of claim 1, wherein the device identifier information includes at least one of a unique machine identifier, a security identifier of the computer system, a domain identifier, a hardware identifier, an intune identifier, and an advanced malware protection identifier.

3. The method of claim 1, wherein the device identifier information is received in response to a completion of a first factor authentication of a two-factor authentication.

4. The method of claim 3, wherein the generating the device identifier and the enrollment token is performed in response to a completion of a second factor authentication of the two-factor authentication.

5. The method of claim 1, further comprising determining that enrollment of the computer system is needed based on an absence or a presence of a signature from the signed key data associated with the device identifier information.

6. The method of claim 5, further comprising enrolling the computer system as a secure device based on the signed key data.

7. The method of claim 6, wherein the enrolling is based on a validation of the enrollment token extracted from the signed key data.

8. The method of claim 1, wherein the keypair is generated using cryptography.

9. The method of claim 1, wherein the signed key data includes the public key associated with the device identifier and the keypair is associated with a user.

10. The method of claim 9, further comprising performing authentication of the user based on the signed key data.

11. A method for authenticating a computer system, comprising:

determining, by a processor of the computer system, device identifier information associated with the computer system;

receiving, by the processor of the computer system from a server, a device identifier and an enrollment token based on the device identifier information;

generating, by the processor of the computer system, a keypair including a public key and a private the device identifier and the enrollment token as inputs to a cryptographic key generation process; and transmitting, to a processor of the server, the public key signed with the private key as a signed key data for performing authentication of the computer system based on the signed key data.

12. The method of claim 11, wherein the device identifier information includes at least one of a unique machine identifier, a security identifier of the computer system, a domain identifier, a hardware identifier, an intune identifier, and an advanced malware protection identifier.

13. The method of claim 11, further comprising completing a first factor authentication of a two-factor authentication, and wherein the determining the device identifier information is in response to the completing.

14. The method of claim 13, further comprising completing a second factor authentication of the two-factor authentication, and wherein the receiving the device identifier and the enrollment token is in response to the completing of the second factor authentication of the two-factor authentication.

15. The method of claim 14, further comprising enrolling the computer system as a secure device based on the signed key data.

16. The method of claim 15, wherein the public key is generated from the enrollment token and the device identifier information.

17. The method of claim 11, wherein the keypair is generated using cryptography.

18. The method of claim 11, wherein the signed key data includes the public key associated with the device identifier and the keypair is associated with a user.

19. The method of claim 18, further comprising performing authentication of the user based on the signed key data.

20. A system for authenticating a computer system, comprising:

one or more processors; and at least one of a first computer-readable storage medium and a second computer-readable storage medium, the first computer-readable storage medium storing instructions which, when executed by the one or more processors, cause the one or more processors to:

receive device identifier information associated with the computer system;

generate a device identifier and an enrollment token based on the device identifier information;

communicate the device identifier and the enrollment token to the computer system;

receive a public key signed with a private key as a signed key data in response to the communicating, wherein the public key and the private key are parts of a keypair generated by the computer system from the enrollment token and the device identifier as inputs to a cryptographic key generation process; and perform authentication of the computer system based on the signed key data; and the second computer-readable storage medium storing instructions which, when executed by the one or more processors, cause the one or more processors to:

determine the device identifier information associated with the computer system;

receive the device identifier and the enrollment token based on the device identifier information;

generate the keypair including the public key and the private key from the device identifier and the enrollment token as inputs to the cryptographic key generation process; and transmit the signed key data for performing the authentication of the computer system based on the signed key data.

* * * * *